United States Patent
Bacot et al.

(10) Patent No.: US 12,025,518 B2
(45) Date of Patent: Jul. 2, 2024

(54) PRESSURIZED-FLUID CONTAINER WITH A PRESSURE INDICATOR DEVICE

(71) Applicants: L'Air Liquide, Société Anonyme pour l'Etude et l'Exploitation des Procédés Georges Claude, Paris (FR); Alizent International, Paris (FR)

(72) Inventors: Patrick Bacot, Meudon (FR); Antoine Frenal, Ezanville (FR)

(73) Assignees: L'Air Liquide, Societe Anonyme Pour l'Etude et l'Etude et l'Exploitation des Procedes Georges Claude, Paris (FR); Alizent International, Paris (FR)

( * ) Notice: Subject to any disclaimer, the term of this patent is extended or adjusted under 35 U.S.C. 154(b) by 339 days.

(21) Appl. No.: 17/608,664

(22) PCT Filed: Apr. 27, 2020

(86) PCT No.: PCT/EP2020/061576
§ 371 (c)(1),
(2) Date: Nov. 3, 2021

(87) PCT Pub. No.: WO2020/224999
PCT Pub. Date: Nov. 12, 2020

(65) Prior Publication Data
US 2022/0221362 A1    Jul. 14, 2022

(30) Foreign Application Priority Data
May 3, 2019   (FR) ........................... 1904644

(51) Int. Cl.
*G01L 19/08*   (2006.01)
*F17C 13/02*   (2006.01)
*G01L 7/16*    (2006.01)

(52) U.S. Cl.
CPC .......... *G01L 19/083* (2013.01); *F17C 13/025* (2013.01); *G01L 7/16* (2013.01);
(Continued)

(58) Field of Classification Search
CPC ..... G01L 19/08; G01L 19/083; G01L 19/086; G01L 19/12; G01L 17/16; F17C 13/025;
(Continued)

(56) References Cited

U.S. PATENT DOCUMENTS 3,677,089 A * 7/1972 Martin ...................... G01L 7/16
                                                              137/557
4,527,430 A * 7/1985 Leathers ............... G01L 9/0089
                                                               73/745

(Continued)

FOREIGN PATENT DOCUMENTS

| LU | 91 948 | 9/2013 |
|----|--------|--------|
| WO | WO 2017 064380 | 4/2017 |

OTHER PUBLICATIONS

International Search Report and Written Opinion for corresponding PCT/EP2020/061576, dated Jun. 24, 2020.

*Primary Examiner* — Rafael A Ortiz
(74) *Attorney, Agent, or Firm* — Elwood L. Haynes

(57) ABSTRACT

A pressurized fluid container having a pressure indicator device, the device having a piston sensitive to the prevailing pressure in the pressurized fluid container, the piston moving, depending on the value of the pressure in the pressurized fluid container, between at least a retracted position and a deployed position; an indicator component configured to cooperate with the piston, the indicator component moving, depending on the position of the piston, between at least a first position representing a first pressure value and a second position representing a second pressure value.

11 Claims, 3 Drawing Sheets

(52) U.S. Cl.
CPC ............. *F17C 2203/0617* (2013.01); *F17C 2205/0308* (2013.01); *F17C 2205/0323* (2013.01); *F17C 2205/058* (2013.01); *F17C 2223/0123* (2013.01); *F17C 2223/0153* (2013.01); *F17C 2223/035* (2013.01); *F17C 2250/032* (2013.01); *F17C 2250/034* (2013.01); *F17C 2250/043* (2013.01); *F17C 2250/0491* (2013.01); *F17C 2270/02* (2013.01)

(58) Field of Classification Search
CPC ...... F17C 2205/0308; F17C 2205/0323; F17C 2223/0123; F17C 2250/032; F17C 2250/034; F17C 2250/043; F17C 2250/0491
USPC ............................. 206/459.1; 137/553, 554
See application file for complete search history.

(56) References Cited

U.S. PATENT DOCUMENTS

| | | |
|---|---|---|
| 5,014,786 A | 5/1991 | Kobayashi |
| 6,817,311 B1* | 11/2004 | Treen .................... A63B 41/00 116/270 |
| 9,631,775 B2 | 4/2017 | Schmitz |
| 10,466,128 B2* | 11/2019 | Divisi ................. G01L 19/0618 |
| 2005/0016284 A1* | 1/2005 | Bernhard ............... G01L 19/12 73/705 |
| 2005/0229981 A1* | 10/2005 | Frederiksen ............ G01L 19/10 137/557 |
| 2015/0144053 A1* | 5/2015 | Riccardella ........... G01L 19/083 116/268 |
| 2016/0084404 A1* | 3/2016 | Gabrys .................. F16K 11/02 137/553 |
| 2018/0363854 A1 | 12/2018 | Frenal et al. |

* cited by examiner

[Fig. 1]
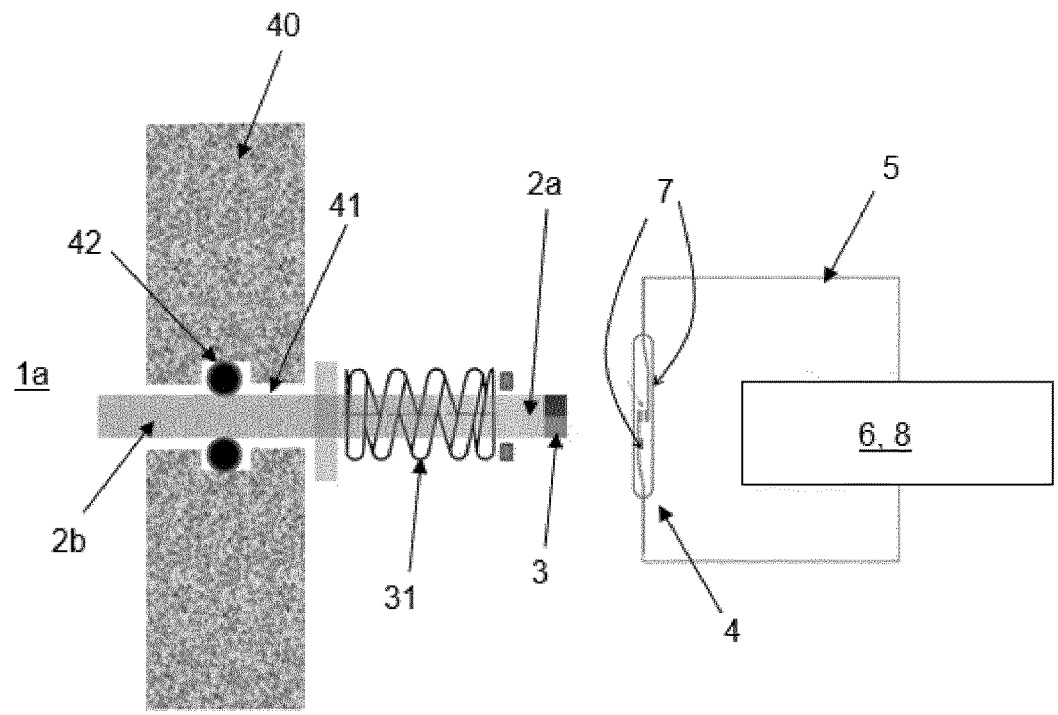
[Fig. 2]
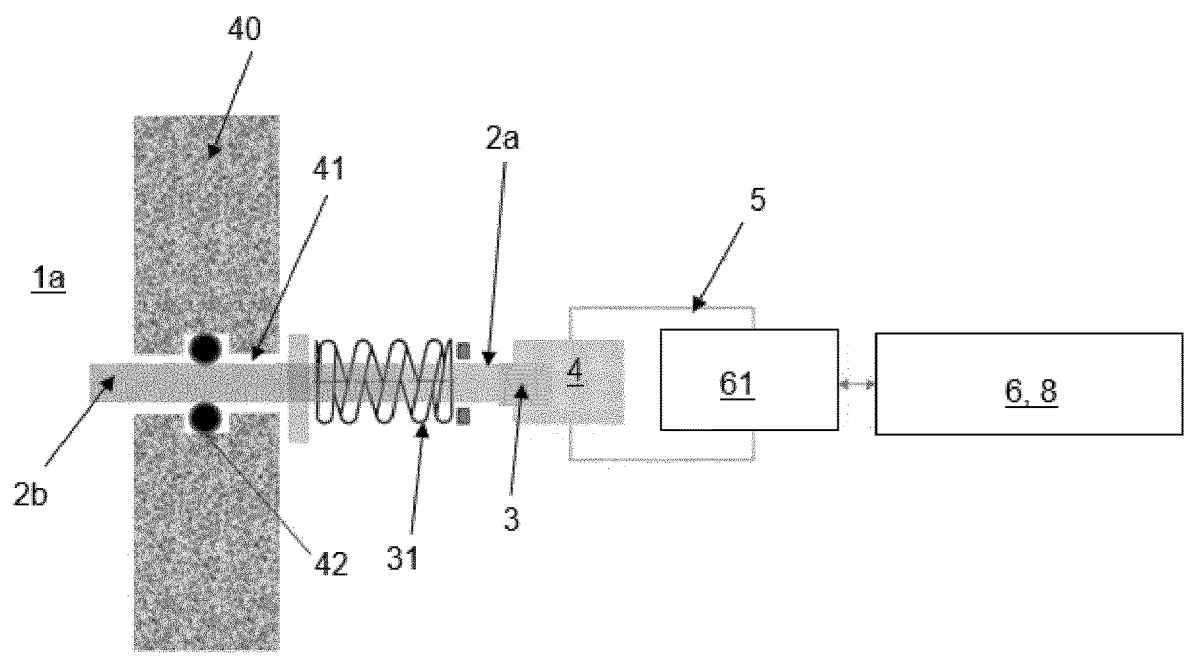

[Fig. 3]
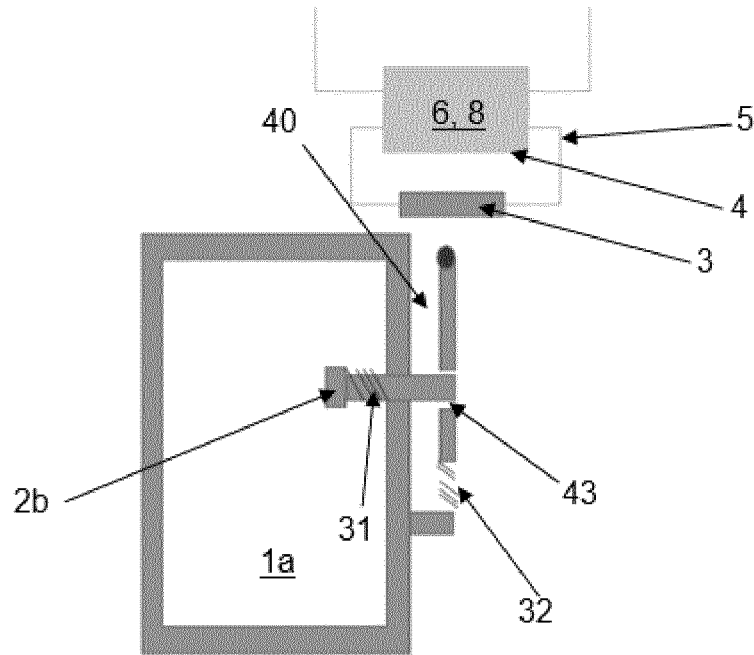
[Fig. 4]
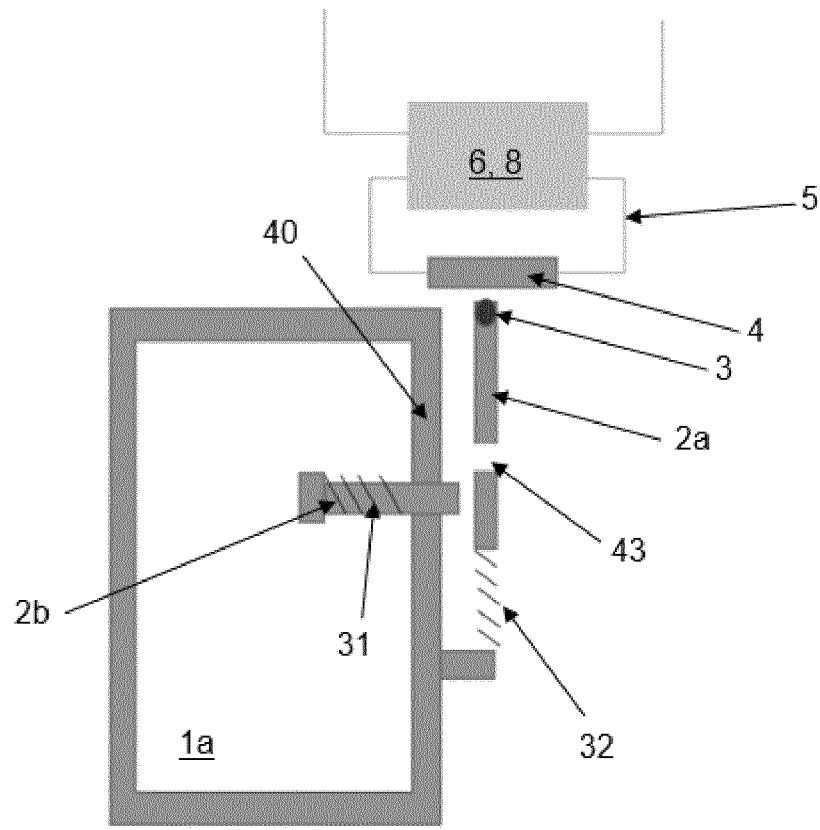

[Fig. 5]
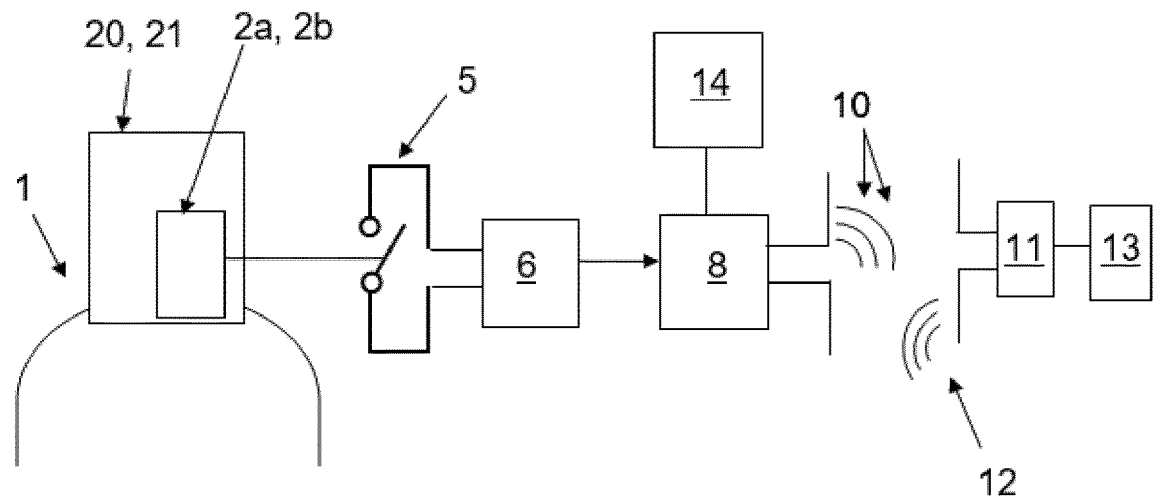
[Fig. 6]
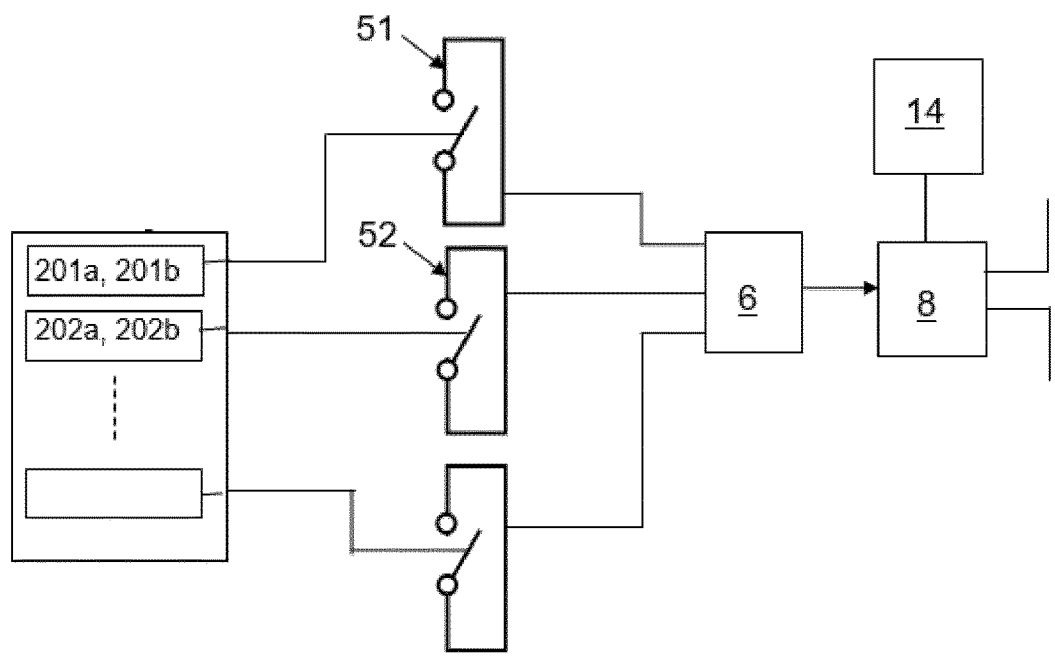

PRESSURIZED-FLUID CONTAINER WITH A PRESSURE INDICATOR DEVICE

CROSS REFERENCE TO RELATED APPLICATIONS

This application is a 371 of International Application No. PCT/EP2020/061576, filed Apr. 27, 2020, which claims priority to French Patent Application No. 1904644, filed May 3, 2019, the entire contents of which are incorporated herein by reference.

BACKGROUND

The present invention relates to a pressurized fluid container h an indicator of the pressure inside said container.

The term "fluid" means an industrial or medical fluid that can be conditioned in the gaseous, liquid or two-phase state (gas and liquid) in a fluid container, such as a cylinder, supplying the fluid to a device using said fluid.

Normally, a fluid supply device comprises a fluid container designed to contain a pressurized fluid, i.e. a fluid at a pressure higher than the pressure of the ambient atmosphere.

Due to the use of the fluid, the container needs to be regularly filled. The filling requirement depends on the assessment of the amount of fluid remaining in the container. To this end, the fluid container can be equipped with mechanical pressure gauges indicating the prevailing pressure inside the fluid container.

However, the display of these pressure gauges needs to be directly read by an operator and they do not allow automated monitoring of the content of the fluid container and the associated logistics.

A simplified pressure indicator device is known from document WO 2017/064380 A1 that comprises an information medium that can move as a function of the fluid pressure. A disadvantage of this device is that it still needs to be viewed by the user, which can prove to be inconvenient in difficult to access conditions or when monitoring a plurality of fluid containers is involved.

To overcome this disadvantage, one solution involves using analog sensors providing an electrical signal representing the amount of fluid contained in the fluid container, with the reading and the transmission of the information relating to the amount of fluid occurring remotely by a radio frequency signal.

However, these sensors are complex and result in a prohibitive increase in the cost of equipment in view of the individual cost of the containers and/or the large number of containers to be managed. Furthermore, they require relatively high electrical power supply and reading powers, of the order of a few mW, which requires having a power source on board, such as a cell or a battery, in the vicinity of the fluid container. In addition to the cost and maintenance problems, the safety of the installations can be compromised in the event of a power cut or if the cells or the battery are discharged.

Therefore, the problem to be addressed involves overcoming all or some of the aforementioned disadvantages, in particular it involves providing a fluid container allowing the amount of fluid contained in said container to be determined more simply, more quickly and automatically, even at a distance of more than several meters.

SUMMARY

To this end, the solution of the invention is a pressurized fluid container comprising a pressure indicator device, said device comprising:

a piston sensitive to the prevailing pressure in the container, the piston being able to move, depending on the value of the pressure in the container, between at least a retracted position and a deployed position;
an indicator component intended to cooperate with the piston, the indicator component being able to move, depending on the position of the piston, between at least a first position representing a first pressure value and a second position representing a second pressure value;

characterized in that it further comprises:

a sensor for the position of the indicator component;
at least one electrical circuit connected to or integrated in said sensor and configured to assume at least a first electrical state or a second electrical state depending on the position of the indicator component;
an electronic logic connected to the electrical circuit and configured to produce an electrical signal representing the position of the indicator component; and
a communication component connected to the electronic logic configured to convert said electrical signal into a wireless remote communication signal representing the position of the indicator component.

As appropriate, the invention can comprise one or more of the following feature(s):

the indicator component comprises a magnetic element, preferably a permanent magnet, with the sensor for the position of the movable element comprising a sensor sensitive to a magnetic field induced by the magnetic element;
the indicator component comprises an electrically conductive element, with the sensor for the position of the indicator component comprising two electrical poles integrated in or connected to the electrical circuit, said electrical poles being intended to be selectively connected together via the electrically conductive element;
the indicator component and the sensor are configured so that a movement of the indicator component between the first position and the second position switches the electrical circuit between the first electrical state and the second electrical state;
the piston is configured to assume the deployed position when the pressure in the container is greater than or equal to a predetermined high threshold and to assume the retracted position when the pressure in the container is less than a predetermined low threshold;
the indicator component is intended to cooperate with the piston so that a movement of the piston from its deployed position to its retracted position causes an automatic movement of the indicator component from its first position to its second position;
the piston at least partially extends into a pressurized internal volume of the container so that the fluid exerts a pressure on the piston;
the piston is configured to translationally move between at least the retracted position and the deployed position under the effect of a variation in the pressure exerted on the piston;
the device comprises a first resilient element, preferably a spring, configured to exert a first return force on the piston against the pressure exerted on the piston in the container;
the container comprises a wall demarcating a pressurized internal volume, with at least part of the piston being able to translationally move in said internal volume and the indicator component being located outside the internal volume;

the piston is translationally movable in a passage provided in the wall of the container, with the sensor being positioned facing the passage;

the indicator component and the piston are rigidly connected together, preferably the indicator component and the piston are formed by a block, with the indicator component forming an end portion of the piston;

the indicator component and the piston are separate parts and are configured so that the piston forms, in its deployed position, a component for blocking the indicator component and so that a movement of the piston toward its retracted position releases the movable element and allows it to move between the first position and the second position;

the device comprises a second resilient element, preferably a spring, configured to exert a second return force tending to return the indicator component from the second position to the first position.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 1 shows a pressure indicator device according to one embodiment of the invention;

FIG. 2 shows a pressure indicator device according to another embodiment of the invention;

FIG. 3 shows a pressure indicator device according to another embodiment of the invention;

FIG. 4 shows the device according to FIG. 3 in another position;

FIG. 5 illustrates the remote transmission of information relating to the fluid pressure in a container by means of an indicator device according to one embodiment of the invention;

FIG. 6 illustrates an alternative embodiment of the invention.

DETAILED DESCRIPTION OF PREFERRED EMBODIMENTS

FIG. 1 schematically shows a pressure indicator device according to one embodiment of the invention, which device is integrated in a pressurized fluid container (not shown in FIG. 1). It should be noted that, within the scope of the invention, the fluid can be a fluid in the gaseous, liquid or two-phase, gas-liquid state, and can be pure or resulting from a mixture of different types of fluids. Preferably, the fluid is in the gaseous state.

Preferably, the pressurized fluid container 1, for example, a cylinder 1, of the industrial or medical type, is provided with an orifice, in which a fluid connector or port, called tap 20, is attached, with or without an integrated expansion valve. As schematically shown in FIG. 4, the cylinder 1 can comprise a cap 21 for protecting the tap 20. The cap 21 is rigidly attached to the cylinder 1, for example. The cap 21 forms a protective wall around at least part of the tap 20.

In particular, the tap 20 can be a simple filling and/or tapping port provided with a self-closing valve (opening by mechanical activation and/or via a gas pressure). As a variant, this first tap can be a more sophisticated tap, particularly provided with an isolation valve controlled by a manual, electric and/or pneumatic control component. For example, the structure of a tap as described in document WO 2017/064380 A1 can be fully or partly used.

The tap 20 conventionally comprises an internal fluid circuit connected to the actual storage volume of the container 1 and can further comprise any other normal functional component for a tap.

The container 1 is provided with an indicator device, namely a piston 2b sensitive to the prevailing pressure in the container 1. The piston 2b is configured to move, depending on the value of the pressure in the container 1, between at least a retracted position and a deployed position.

A movable indicator component 2a is provided for indicating the pressure in the container 1 in association with the piston 2b so that, depending on the position assumed by the piston 2b, the indicator component 2a moves between at least a first position representing a first pressure value and a second position representing a second pressure value.

According to the invention, the indicator device further comprises a sensor 4 configured to detect the position of the indicator component 2a and at least one electrical circuit 5 connected to or integrated in said sensor 4. An "electrical circuit" is understood to mean a plurality of electrical components that are electrically connected together and that can be traversed by an electrical current.

The electrical circuit 5 can assume at least a first electrical state or a second electrical state depending on the position of the indicator component 2a.

During operation, an electronic logic 6 reads the electrical state of the circuit 5 and produces an electrical signal representing this state. This electrical signal is transmitted to the communication component 8, which is configured to convert it into a wireless remote communication signal 10 representing the position of the indicator component 2a, and therefore the pressure in the container 1, FIG. 5 schematically shows an operating mode of the invention.

The pressure related information can be obtained by the electronic logic 6, by means of, for example, one or more computation rule(s) stored in the electronic logic 6 or in a memory 14 connected to the electronic logic 6, Preferably, the electronic logic 6 comprises at least one microprocessor, one microcontroller or any other suitable system for acquiring and processing data originating from the sensor 4 and/or from the electrical circuit 5.

Thus, it is possible to automatically determine a state relating to the amount of fluid contained in the container 1 by measuring the pressure in the container 1, which is carried out by remote wireless detection. This determination of a state also can be easily carried out on a plurality of containers without the operator having to view each container. The present invention enables better management of a set of fluid containers and can be particularly used for offering services, such as stock management assistance, automatic fluid control, traceability of uses, etc.

For example, the electrical circuit 5 can assume the first electrical state when the indicator component 2a is in its first position indicating a first pressure value, with which a state called "normal pressure" or "full" state is associated, in which the pressure is greater than a predetermined high threshold.

The electrical circuit 5 can assume the second electrical state when the indicator component 2a is in its second position indicating a second pressure value, with which a state called "low pressure" or "empty" state is associated, in which the pressure is less than a predetermined low threshold.

Preferably, the indicator component 2a assumes the first position or the second position when the piston is in its deployed or retracted position, respectively.

Other association configurations between the position of the piston 2b, the position of the indicator component 2a and the pressure value in the container 1 or its filling state obviously can be contemplated. The piston 2b and/or the indicator component 2a can also assume at least one intermediate position between the deployed position and the retracted position and/or between the first and the second position, so as to indicate at least one filling state or an intermediate pressure level.

Preferably, the sensor 4 is configured to measure a physical quantity representing the position of the indicator component 2a.

Thus, as illustrated in FIG. 1 or FIG. 2, the sensor 4 can be a magnetic sensor and the indicator component 2a can comprise a magnetic element 3, such as a magnet or other ferromagnetic part, rigidly connected to the indicator component 2a. The sensor 4 is configured to measure a magnetic field induced by the magnetic element 3.

Preferably, the indicator component 2a and the sensor 4 cooperate so that a movement of the indicator component 2a between its first and its second position results in a variation in the magnetic field measured by the sensor 4 and a change in the electrical state of the circuit 5.

Within the scope of the invention, the sensor 4 can comprise a Hall-effect cell or even a "reed" type switch, also called "reed" cartridge, or a flexible strip switch. This type of switch is a magnetic switch comprising at least two magnetizable and resilient electrical contact zones 7 (FIG. 1). In the presence of a magnetic field, the contact zones magnetize by influence, and are attracted to each other. The zones 7 approach and touch each other, establishing an electrical current in the circuit 5. When the magnetic field ends, the magnetization also ends, and the resilience of the contacts separates them, cutting off the current.

The use of a reed switch provides a longer service life as well as improved reliability, with approximately 10 million opening/closing cycles being able to be carried out.

As a variant, as illustrated in FIG. 2, the sensor 4 can comprise a coil comprising a winding of electrically conductive wire. The indicator component 2a provided with a magnetic element 3 is configured so as to at least partially move in the coil. The sensor 4 is then of the analog type and comprises a circuit for measuring the magnetic field induced in the coil.

According to another embodiment, the indicator component 2a comprises a conductive element 3 formed by an electrically conductive material. Preferably, the sensor 4 comprises two electrical poles integrated in or connected to the electrical circuit 5 and being able to be electrically and selectively connected together via the electrically conductive element 3, directly or via intermediate electrical relays.

The sensor 4 can also comprise a microswitch, or miniswitch, comprising at least two electrical poles and a tab that can be activated under the effect of a pressure exerted by the indicator component 2a or under the effect of a magnetic field induced by a magnetic element 3, so that the tab may or may not ensure electrical contact between said electrical poles.

Preferably, the indicator component 2a and the sensor 4 are configured so that a movement of the indicator component 2a between the first position and the second position switches the electrical circuit 5 between the first electrical state and the second electrical state, preferably by triggering, by mechanical or magnetic activation, the opening or closing of an electrical contact, thus changing the state of an electrical circuit, which state can be read by the electronic logic 6.

Preferably, the electrical circuit 5 is configured to assume the first electrical state when the pressure in the container 1 is greater than or equal to a predetermined high threshold and to assume the second electrical state when the pressure in the container 1 is below a predetermined low threshold.

Preferably, the communication signal 10 comprises at least one information bit, which can assume only two values depending on whether the electrical circuit is in its first state or in its second state. This information can be direct information relating to the state of the electrical circuit or even information derived from the state of the electrical circuit, such as information relating to whether or not the predetermined threshold has been exceeded, the filled or empty state of the container 1.

Advantageously, the first electrical state and the second electrical state of the electrical circuit 5 respectively correspond to an open state, in which no electrical current can circulate in the electrical circuit 5, and to a closed state, in which an electrical current can circulate in the electrical circuit 5, or vice versa. Thus, detecting whether or not the predetermined threshold has been exceeded, via the change of state of the circuit 5, is carried out in a reliable and simplified manner.

Thus, the pressure indicator device generates a simple signal representing the pressure in the container 1, by means of a logic state that can only assume two values, the first and the second electrical states.

Reading a simple electrical state offers the advantage of requiring significantly reduced electrical powers, typically of approximately ten microwatts or even of a few microwatts at most, compared to reading an analog sensor that produces more complex information that requires more energy to process.

According to a particular embodiment, the electrical circuit 5 is configured to switch from the first electrical state to the second electrical state when the pressure in the container 1 varies from an initial value, which is greater than or equal to the predetermined low threshold, to a new value, which is lower than said predetermined low threshold, and/or to switch from the second electrical state to the first electrical state when the pressure varies from an initial value, which is less than or equal to the predetermined high threshold, to a new value, which is greater than said predetermined high threshold.

The term "initial value" respectively means a value of the pressure at an initial instant in which the container 1 is in an initial state, and the term "new value" means a modified value of the pressure, measured at a time after the initial time.

Preferably, two separate high and low thresholds are provided, as a function of which the switching of the electrical circuit 5 is triggered, more preferably, the low threshold is strictly lower than the high threshold.

Thus, the electrical circuit 5 can be configured to switch between the first state and the second state when the pressure value reaches or crosses a given threshold, with this taking into account switching thresholds with different values depending on the way the pressure varies, i.e. if the variation is increasing or decreasing.

This allows the hysteresis phenomenon to be taken into account that characterizes certain sensors and allows the consequences of slight variations in the pressure to be overcome that could result in undesired changes in the state of the electrical circuit 5, yet without reflecting a real change in the pressure in the container 1. This results in greater reliability and better reproducibility of the operation of the device according to the invention.

According to one embodiment, the first electrical state and the second electrical state of the circuit 5 respectively represent a "normal pressure" state and a "low pressure" state of the container 1.

When the initial state of the container 1 is "normal pressure", the electrical circuit initially assumes the first electrical state. The switch from the first electrical state to the second electrical state is carried out by means of a comparison with a low threshold S1, for example, S1=15 bar. Thus, when the pressure measured by the sensor 4 varies from an initial value that is greater than or equal to 15 bar to a new value that is less than 15 bar, the indicator device switches from "normal pressure" to "low pressure".

When the initial state of the container is "low pressure", the electrical circuit initially assumes the second electrical state. The switch from the second electrical state to the first electrical state is carried out by means of a comparison with a high threshold 32, for example, S2=16 bar. Thus, when the pressure measured by the sensor 4 varies from an initial value that is less than or equal to 16 bar to a new value that is greater than 16 bar, the state of the container 1 switches from "low pressure" to "normal pressure". In this example, after the electrical circuit 5 switches from an initial state to another state, a variation of at least 1 bar is required in order for the circuit to return to the initial state. Of course, other pressure values can be contemplated. Taking into account two offset switching thresholds therefore ensures stability with respect to the determination of the pressure of the container 1, while preventing the least variation, when it is in the vicinity of a threshold, from causing a change in the state of the circuit 5. In practice, the difference between the two thresholds, commonly called hysteresis, is determined so that it is substantially greater than the probable insignificant variations of the physical quantity, also called "noise".

Advantageously, the predetermined low threshold S1 and high threshold S2 have a relative difference $\Delta S=|S1-S2|/S1$ of at least 1%, more preferably of at least 5%. Such a difference allows any fluctuations to be effectively overcome that can be related to measurement noise, i.e. small variations in the pressure measured by the sensor 4 that would occur irrespective of a change of state of the container 1, while triggering switching of the electrical circuit from one state to another when the physical quantity has a sufficient variation due to a real change in the state of the container 1.

It is also possible to contemplate the predetermined low S1 and high thresholds being coincident, with switching being triggered by an increasing and/or decreasing pressure variation relative to a single switching threshold, FIG. 1, FIG. 2, FIG. 3 and FIG. 4 show examples of the operation of the piston 2b and of the indicator component 2a.

The piston 2b can be a part of generally cylindrical, solid or tubular shape. Preferably, the piston 2b at least partially extends into a pressurized internal volume 1a of the container 1 demarcated by a wall 40, in particular an internal volume in fluid communication with the storage volume, for example, an internal volume of the fluid circuit of the tap of the container, Thus, the fluid pressure is exerted on the piston 2b.

Preferably, the piston 2b is translationally movable between at least its deployed position (FIG. 3) and its retracted position (FIG. 4) under the effect of a pressure variation in the container 1. Advantageously, the piston 2b is configured to translationally move toward the inside of the container 1, i.e. toward its retracted position, under the effect of a reduction in the pressure exerted on the piston 2b inside the container 1.

Advantageously, the indicator device comprises a first resilient element 31, preferably a spring, configured to exert a first return force on the piston 2b against the pressure exerted on the piston 2b in the container 1.

The piston 2b can be configured, for example, by suitable dimensioning of the first resilient element 31, to assume the deployed position when the pressure in the container 1 is greater than or equal to a predetermined high threshold and to assume the retracted position when the pressure in the container 1 is below a predetermined low threshold.

Preferably, the piston 2b is translationally movable in a passage 41 provided in the wall 40. At least one sealing component 42, such as a seal, can be arranged between the piston 2b and the wall 40 so as to provide a fluid seal between the inside and the outside of the container 1. Preferably, the sealing component 42 is arranged around the piston 2b in a peripheral groove provided in the wall 40.

It should be noted that the presence of such a sealing component can cause a hysteresis phenomenon in the response of the piston 2b to a pressure variation in the container 1, with this phenomenon being due to the friction induced by the sealing component. Taking into account separate triggering thresholds as described above in this case is particularly advantageous.

The translational movement of the piston 2b causes a change in the position of the indicator component 2a arranged outside the container 1, which can occur in various embodiments.

FIG. 1 and FIG. 2 show an embodiment in which the piston 2b and the indicator component 2a are formed by a block, i.e. form the same part. In this case, the movement of the indicator component 2a and the movement of the piston 2b occurs in an identical direction and amplitude.

FIG. 3 and FIG. 4 show an embodiment in which the piston 2b and the indicator component 2a are separate parts, with the movement of the indicator component 2a and the movement of the piston 2b occurring in independent directions and amplitudes.

According to this embodiment, the piston 2b forms, in its deployed position, a component for blocking the indicator component 2a. For example, an orifice 43, open or closed, can be provided in the indicator component 2a so as to receive the movable piston 2b, which thus forms a stop. Alternatively, a protuberance can be provided that is arranged on the indicator component 2a so as to block the movement of the component 2a when the piston 2b is in the deployed position.

A movement of the piston 2b toward its retracted position releases the movable element 2a and allows it to move between the first position and the second position.

Preferably, a second resilient element 32, preferably a spring, is arranged so as to exert a second return force on the indicator component 2a tending to move it to the second position.

This embodiment enables the triggering of an automatic movement of the indicator component 2a to the second position, and thus an automatic change of the electrical state of the circuit 5 during a predetermined pressure variation in the container 1.

According to an advantageous variant, which is schematically shown in FIG. 6, the pressure indicator device comprises a plurality of pistons 201b, 202b, combined with a plurality of indicator components 201a, 202a, and with a plurality of electrical circuits 51, 52, etc. The device comprises a whole number N of electrical circuits 51, 52, etc.

Preferably, each circuit 51, 52, etc. is associated with respective predetermined high and low thresholds that are different from each other.

The electronic logic 6 is configured to detect the electrical states of each of the N electrical circuits 51, 52, etc. and to produce at least one electrical signal representing the electrical states of said circuits. The radio frequency communication component 8 is configured to receive this electrical signal and convert it into a wireless remote communication signal 10 containing information representing the electrical states of the N electrical circuits 51, 52, etc.

This signal thus assumes the form of a binary code of at least N bits, with each bit being able to have two values depending on whether the electrical circuit is in its first state or in its second state. The device can thus provide more accurate information with regard to the pressure in the container 1.

In order to facilitate the determination of the state of the container 1, identification information concerning the electrical circuit or the associated sensor will be advantageously associated with the information concerning the state of an electrical circuit.

The greater the number N, the more accurate the determination of the filling state of the container 1. However, to avoid complicating the fluid supply device there must not be too many sensors. Preferably, N ranges between 1 and 10, more preferably between 1 and 5.

Preferably, the communication component 8 is configured to emit data by electromagnetic waves, preferably by radio frequency waves.

Advantageously, the communication component 8 is a radio frequency communication component configured to emit and/or receive a radio frequency signal using at least one of the following technologies: Radio Frequency Identification ("RFID").

In particular, the communication component 8 can be configured to emit and/or receive a radio frequency signal using "RFID" technology with an "ultra-high" frequency typically ranging from several hundred MHz to a few GHz, preferably ranging between 850 and 950 MHz. Using an ultra-high frequency allows the transmission distance of the communication component 8 to be increased, typically up to approximately ten meters.

Other frequencies still can be contemplated. For example, the technology can be of the "low RFID" type, called "low frequency" (frequency of the order of one to a few hundred kHz) or "high frequency" (of the order of one to a few tens of MHz).

It is also possible to contemplate using "Near Field Communication" (NFC) technology.

Optionally, the communication component 8 is connected to or integrates an electrical power supply, such as a battery or a photovoltaic cell, which allows the wireless communication range to be increased, typically up to 100 meters. This is advantageous for the containers 1 or the large storage sites.

Other contactless communication technologies can be contemplated: Wi-Fi, Bluetooth, etc.

In general, the use of contactless communication improves the reliability of the system, due to the absence of a contact zone, with this type of zone wearing out over time.

According to an advantageous variant, the communication component 8 is also configured to receive a polling signal 12 sent by a reading component 11 forming a physical entity separate from the fluid supply device and to transmit, in response to said polling signal 12, a wireless remote communication signal 10 containing information representing the electrical state of at least one electrical circuit 5.

Thus, the fluid supply device is configured to communicate in both directions with any external communication device, in particular a smartphone, a communication gateway.

Preferably, the communication and reading components 8, 11 use the same type of wireless remote communication technology.

Preferably, the electronic reading component 11 integrates or is connected to an electronic unit 13 configured to receive data originating from the electronic reading component 11 of the second assembly and to ensure the acquisition, the processing and/or the transmission of these remote data, with or without wires, for example, to a communication relay and/or to a central data processing platform. The electronic unit 13 preferably comprises a microcontroller.

According to one embodiment, the electronic communication component 8 and/or the electronic reading component 11 can each comprise an antenna for transmitting data in the form of radio or other electromagnetic waves.

Preferably, the communication component 8 comprises a UHF antenna and is configured to electrically power, via the energy of a polling signal 12 sent to an inductive loop, the electronic logic 6 and/or the measurement sensor 2, 3, 4.

More specifically, the communication component 8 can comprise an antenna forming an electric dipole capable of receiving the electromagnetic field originating from the reading component 11 and of converting at least some of the energy of this electromagnetic field into electrical energy.

Preferably, the antenna of the communication component 8 is coupled to an electronic circuit or chip, for example, an integrated circuit. The communication component 8 is thus electrically powered, via its antenna, by the polling signal 12.

Optionally, the device according to the invention further comprises a memory 14 connected to the electronic logic 6 and/or to the communication component 8, or integrated in either of these elements, said memory 14 being configured to store at least one item of information from among: an identification of the container 1, information relating to the nature of the fluid contained in the container 1, information relating to the maximum capacity of the container 1, information relating to the amount of fluid contained in the container 1, information for identifying the owner or the user of the container 1, information relating to the site of use of the container 1, information relating to the expiry date of the fluid contained in the container 1, information relating to a certification of the fluid contained in the container 1, a log of at least one of the preceding items of information. The communication component 8 thus can remotely transmit a communication signal 10 containing one or more of these items of information.

Preferably, all or some of the following elements are arranged on or around the tap 20 of the container 1: the communication component 8, the electrical circuit 5, the electronic logic 6.

As appropriate, the electronic communication component 8 can be integrated in the tap 20 or else integrated in an electronic communication module separate from the tap that can be detachably attached to the tap 20. This electronic module can also integrate all or part of the electronic logic 6.

For example, the communication component 8 can be integrated in a flexible or rigid collar, preferably made of plastic material. For example, the collar is attached to the top of the container 1, for example, between the tap 20 and the container 1.

All or some of the elements of the pressure indicator device also can be integrated into the protective cap 21 and/or rigidly connected to the cap.

As appropriate, the sensor 4 can be arranged so as to measure the pressure in the container 1 in the internal fluid circuit of the tap 20 or in the actual internal volume of the container 1 or even in a fluid pipe in fluid communication with the internal volume of the fluid container.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A pressurized fluid container comprising a pressure indicator device, the device comprising:
    a piston sensitive to the prevailing pressure in the pressurized fluid container, the piston moving, depending on the value of the pressure in the pressurized fluid container, between at least a retracted position and a deployed position;
    an indicator component configured to cooperate with the piston, the indicator component moving, depending on the position of the piston, between at least a first position representing a first pressure value and a second position representing a second pressure value;
    further comprising:
    a sensor for the position of the indicator component;
    at least one electrical circuit connected to or integrated in said sensor and configured to assume at least a first electrical state or a second electrical state depending on the position of the indicator component;
    an electronic logic connected to the electrical circuit and configured to produce an electrical signal representing the position of the indicator component; and
    a communication component connected to the electronic logic configured to convert said electrical signal into a wireless remote communication signal representing the position of the indicator component.

2. The device as claimed in claim 1, wherein the indicator component comprises a magnetic element, the sensor for the position of the movable element comprising a sensor sensitive to a magnetic field induced by the magnetic element.

3. The device as claimed in claim 1, wherein the indicator component and the sensor are configured so that a movement of the indicator component between the first position and the second position switches the electrical circuit between the first electrical state and the second electrical state.

4. The device as claimed in claim 1, wherein the piston is configured to assume the deployed position when the pressure in the pressurized fluid container is greater than or equal to a predetermined high threshold and to assume the retracted position when the pressure in the pressurized fluid container is less than a predetermined low threshold.

5. The device as claimed in claim 1, wherein the indicator component is configured to cooperate with the piston so that a movement of the piston from the deployed position to the retracted position causes an automatic movement of the indicator component from the first position to the second position.

6. The device as claimed in claim 1, wherein the piston at least partially extends into a pressurized internal volume of the pressurized fluid container so that the fluid exerts a pressure on the piston.

7. The device as claimed in claim 6, wherein the piston is configured to translationally move between at least the retracted position and the deployed position under the effect of a variation in the pressure exerted on the piston.

8. The device as claimed in claim 6, further comprising a first resilient element configured to exert a first return force on the piston against the pressure exerted on the piston in the pressurized fluid container.

9. The device as claimed in claim 1, wherein the pressurized fluid container comprises a wall demarcating a pressurized internal volume, with at least part of the piston being able to translationally move in said internal volume and the indicator component being located outside the internal volume.

10. The device as claimed in claim 9, wherein the piston is translationally movable in a passage provided in the wall of the pressurized fluid container, with the sensor being positioned facing the passage.

11. The device as claimed in claim 1, wherein the indicator component and the piston are rigidly connected together and the piston are formed by a block, with the indicator component forming an end portion of the piston.

\* \* \* \* \*